United States Patent
Venkatesh et al.

(10) Patent No.: US 9,372,865 B2
(45) Date of Patent: Jun. 21, 2016

(54) DEDUPLICATION METADATA ACCESS IN DEDUPLICATION FILE SYSTEM

(71) Applicant: ATLANTIS COMPUTING, INC., Mountain View, CA (US)

(72) Inventors: Chetan C Venkatesh, San Mateo, CA (US); Abhijit P Hoskeri, Mountain View, CA (US)

(73) Assignee: Atlantis Computing, Inc., Mountain View, CA (US)

( * ) Notice: Subject to any disclaimer, the term of this patent is extended or adjusted under 35 U.S.C. 154(b) by 0 days.

(21) Appl. No.: 13/765,664

(22) Filed: Feb. 12, 2013

(65) Prior Publication Data
US 2014/0229451 A1    Aug. 14, 2014

(51) Int. Cl.
*G06F 17/30* (2006.01)

(52) U.S. Cl.
CPC .... *G06F 17/30156* (2013.01); *G06F 17/30159* (2013.01); *G06F 17/30162* (2013.01)

(58) Field of Classification Search
CPC ................... G06F 17/30156; G06F 17/30159; G06F 17/30162; G06F 3/0608; G06F 3/0641; G06F 3/067; G06F 11/1453
USPC ....................................................... 707/692
See application file for complete search history.

(56) References Cited

U.S. PATENT DOCUMENTS

| | | | |
|---|---|---|---|
| 4,603,380 A | 7/1986 | Easton et al. | |
| 6,675,214 B2 | 1/2004 | Stewart et al. | |
| 6,807,619 B1 | 10/2004 | Ezra et al. | |
| 6,915,302 B1 | 7/2005 | Christofferson et al. | |
| 7,269,608 B2 | 9/2007 | Wong et al. | |
| 7,356,651 B2 | 4/2008 | Liu et al. | |
| 7,571,288 B2 | 8/2009 | Pudipeddi et al. | |
| 7,908,436 B1 * | 3/2011 | Srinivasan et al. | 711/114 |
| 8,046,446 B1 | 10/2011 | Karr et al. | |
| 8,117,464 B1 | 2/2012 | Kogelnik | |
| 8,312,471 B2 | 11/2012 | Davis | |
| 8,495,288 B2 | 7/2013 | Hosoya et al. | |
| 8,566,821 B2 | 10/2013 | Robinson et al. | |
| 8,732,401 B2 | 5/2014 | Venkatesh et al. | |
| 2002/0124137 A1 | 9/2002 | Ulrich et al. | |
| 2003/0145045 A1 | 7/2003 | Pellegrino et al. | |
| 2003/0188045 A1 | 10/2003 | Jacobson | |
| 2004/0111443 A1 | 6/2004 | Wong et al. | |
| 2004/0128470 A1 | 7/2004 | Hetzler et al. | |
| 2005/0038850 A1 | 2/2005 | Oe et al. | |
| 2005/0108440 A1 | 5/2005 | Baumberger et al. | |
| 2005/0114595 A1 | 5/2005 | Karr et al. | |
| 2005/0131900 A1 | 6/2005 | Palliyll et al. | |
| 2006/0112251 A1 | 5/2006 | Karr et al. | |

(Continued)

*Primary Examiner* — Alex Gofman
*Assistant Examiner* — Umar Mian
(74) *Attorney, Agent, or Firm* — Blakely, Sokoloff, Taylor & Zafman LLP

(57) ABSTRACT

Techniques associated with deduplication metadata access in a deduplication file system are described, including determining a state of a file system, reading a table associated with the file system, including reading block numbers associated with files in the file system, the table being stored in a storage, wherein the block numbers include a block number and logical block number, determining whether each of the block numbers exists in a reconstruction map, modifying the reconstruction map, obtaining a hash value associated with each of the block numbers, reading data blocks from a disk using the plurality of block numbers, and constructing deduplication metadata in system memory (i.e., RAM) using a read of the data blocks.

17 Claims, 7 Drawing Sheets

(56) References Cited

U.S. PATENT DOCUMENTS

| | | |
|---|---|---|
| 2006/0272015 A1 | 11/2006 | Frank et al. |
| 2007/0005935 A1 | 1/2007 | Khosravi et al. |
| 2007/0192534 A1* | 8/2007 | Hwang et al. ............... 711/103 |
| 2007/0248029 A1 | 10/2007 | Merkey et al. |
| 2007/0260702 A1 | 11/2007 | Richardson et al. |
| 2007/0266037 A1 | 11/2007 | Terry et al. |
| 2008/0183986 A1 | 7/2008 | Yehia et al. |
| 2009/0063528 A1* | 3/2009 | Yueh ........................... 707/101 |
| 2009/0063795 A1 | 3/2009 | Yueh |
| 2009/0089337 A1 | 4/2009 | Perlin et al. |
| 2009/0254507 A1 | 10/2009 | Hosoya et al. |
| 2009/0319772 A1 | 12/2009 | Singh et al. |
| 2010/0031000 A1 | 2/2010 | Flynn et al. |
| 2010/0064166 A1 | 3/2010 | Dubnicki et al. |
| 2010/0070725 A1 | 3/2010 | Prahlad et al. |
| 2010/0180153 A1 | 7/2010 | Jernigan, IV et al. |
| 2010/0188273 A1 | 7/2010 | He et al. |
| 2010/0274772 A1 | 10/2010 | Samuels |
| 2010/0306444 A1 | 12/2010 | Shirley et al. |
| 2011/0035620 A1 | 2/2011 | Elyashev |
| 2011/0055471 A1* | 3/2011 | Thatcher et al. ............. 711/114 |
| 2011/0071989 A1 | 3/2011 | Wilson et al. |
| 2011/0082836 A1* | 4/2011 | Wang et al. .................. 707/649 |
| 2011/0131390 A1 | 6/2011 | Srinivasan et al. |
| 2011/0145243 A1 | 6/2011 | Yudenfriend |
| 2011/0167045 A1 | 7/2011 | Okamoto |
| 2011/0196900 A1 | 8/2011 | Drobychev et al. |
| 2011/0265083 A1 | 10/2011 | Davis |
| 2011/0276781 A1* | 11/2011 | Sengupta et al. ............. 711/216 |
| 2011/0295914 A1 | 12/2011 | Mori |
| 2012/0016845 A1 | 1/2012 | Bates |
| 2012/0054445 A1 | 3/2012 | Swart et al. |
| 2012/0137054 A1 | 5/2012 | Sadri et al. |
| 2012/0151477 A1 | 6/2012 | Sinha et al. |
| 2012/0159115 A1 | 6/2012 | Cha et al. |
| 2012/0254131 A1 | 10/2012 | Kiswany |
| 2013/0013865 A1 | 1/2013 | Venkatesh et al. |
| 2013/0117494 A1 | 5/2013 | Hughes et al. |
| 2013/0124523 A1 | 5/2013 | Rogers et al. |
| 2013/0166831 A1 | 6/2013 | Atkisson et al. |
| 2013/0238876 A1 | 9/2013 | Fiske et al. |
| 2013/0282627 A1 | 10/2013 | Faddoul et al. |
| 2013/0283004 A1 | 10/2013 | Devine et al. |
| 2014/0181119 A1* | 6/2014 | Chiueh et al. ................. 707/747 |

* cited by examiner

| Block Group | Blocks |
|---|---|
| A | 202, 204, 206, 208, 210 |
| B | 212, 214, 216, 218 |
| ... | ..., N |

DEDUPLICATION METADATA ACCESS IN DEDUPLICATION FILE SYSTEM

FIELD OF THE INVENTION

The invention relates generally to software, data storage, and virtualized computing and processing resources. More specifically, techniques for deduplication metadata access in a deduplication file system are described.

BACKGROUND OF THE INVENTION

Conventional solutions for accessing deduplication file system metadata suffer from high latency problems, particularly if the deduplication is conducted inline or in an input/output (I/O) path. Latency in deduplication file systems can occur due to the necessity for disk-based access of deduplication file system metadata due to such metadata being stored on disk drives ("disk") or other non-volatile or primary storage (i.e., on disk).

Storing deduplication metadata on disk involves bundling metadata blocks in the same transaction as associated data blocks. If there is any partial read of a metadata block that is not in Random Access Memory (RAM), the metadata must be read from the disk. Conventional deduplication solutions require storing deduplication metadata on disk, and accessing the disk or other non-volatile storage to obtain the deduplication metadata, which results in high latency.

Thus, what is needed is a solution for accessing deduplication file system metadata without the limitations of conventional techniques.

BRIEF DESCRIPTION OF THE DRAWINGS

Various embodiments of the invention are disclosed in the following detailed description and the accompanying drawings.

Figure 1:
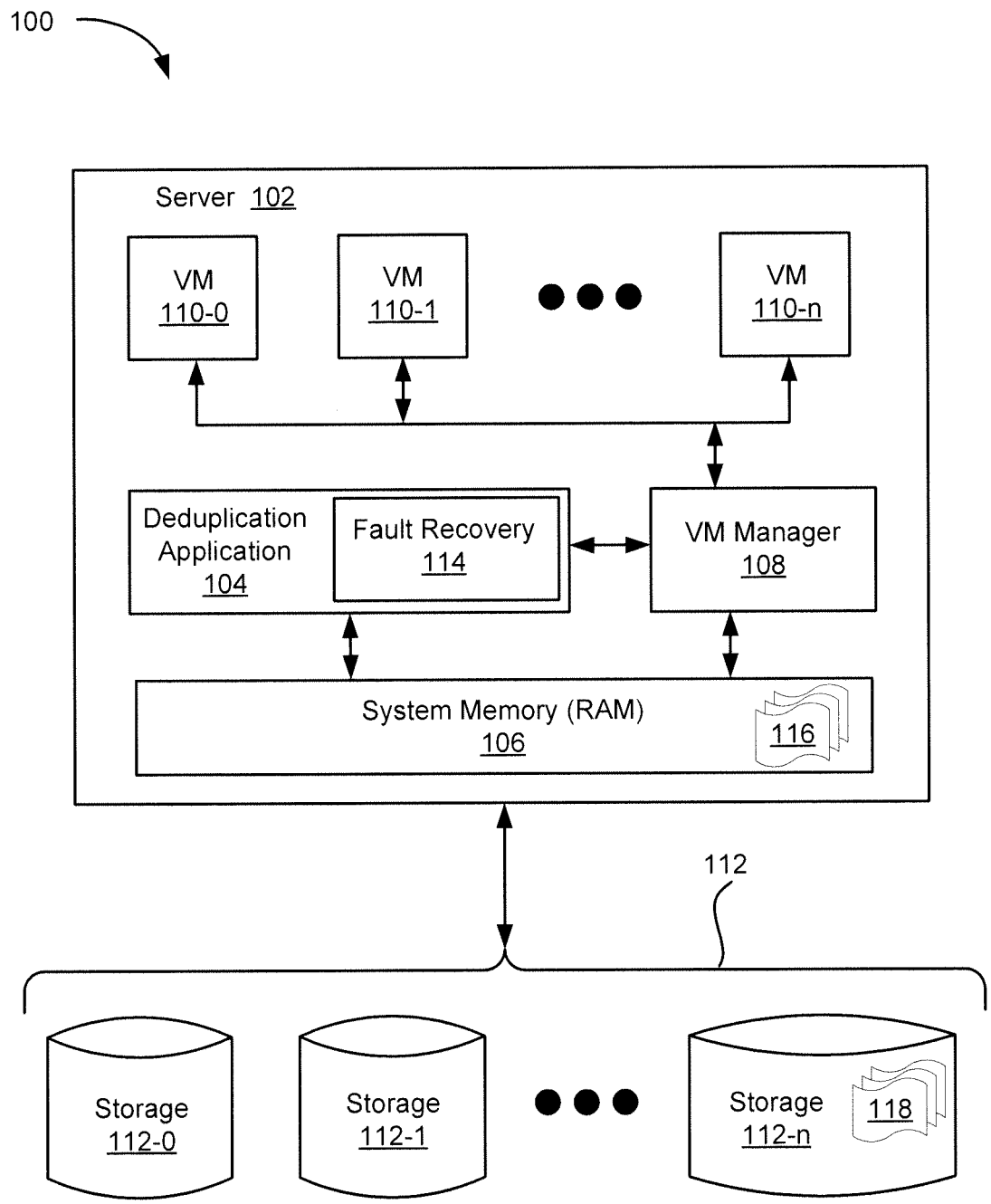
FIG. 1 illustrates an exemplary system for accessing deduplication metadata in a deduplication file system.

Although the above-described drawings depict various examples of the invention, the invention is not limited by the depicted examples. It is to be understood that, in the drawings, like reference numerals designate like structural elements. Also, it is understood that the drawings are not necessarily to scale.

DETAILED DESCRIPTION

Various embodiments or examples may be implemented in numerous ways, including as a system, a process, an apparatus, a user interface, or a series of program instructions on a computer readable medium such as a computer readable storage medium or a computer network where the program instructions are sent over optical, electronic, or wireless communication links. In general, operations of disclosed processes may be performed in an arbitrary order, unless otherwise provided in the claims.

A detailed description of one or more examples is provided below along with accompanying figures. The detailed description is provided in connection with such examples, but is not limited to any particular example. The scope is limited only by the claims and numerous alternatives, modifications, and equivalents are encompassed. Numerous specific details are set forth in the following description in order to provide a thorough understanding. These details are provided for the purpose of example and the described techniques may be practiced according to the claims without some or all of these specific details. For clarity, technical material that is known in the technical fields related to the examples has not been described in detail to avoid unnecessarily obscuring the description.

In some examples, the described techniques may be implemented as a computer program or application ("application") or as a plug-in, module, or sub-component of another application. The described techniques may be implemented as software, hardware, firmware, circuitry, or a combination thereof. If implemented as software, then the described techniques may be implemented using various types of programming, development, scripting, or formatting languages, frameworks, syntax, applications, protocols, objects, or techniques, including ASP, ASP.net, Net framework, Ruby, Ruby on Rails, C, Objective C, C++, C#, Adobe® Integrated Runtime™ (Adobe® AIR™), ActionScript™, Flex™, Lingo™, Java™, Javascript™, Ajax, Perl, COBOL, Fortran, ADA, XML, MXML, HTML, DHTML, XHTML, HTTP, XMPP, PHP, and others. Software and/or firmware implementations may be embodied in a non-transitory computer readable medium configured for execution by a general purpose computing system or the like. The described techniques may be varied and are not limited to the examples or descriptions provided.

Techniques for metadata access in a deduplication file system without accessing on disk deduplication metadata are described. As used herein, "deduplication" is a technique for eliminating duplicate copies of repeating data for storage (i.e., in primary storage, such as a disk drive or other non-volatile storage medium). As described herein, deduplication metadata for a file system may be constructed in system memory (i.e., Random Access Memory (RAM) or other volatile or temporary memory), and the file system mounted (i.e., formatted) for input/output (I/O) operations, without accessing deduplication metadata on disk. Maintaining deduplication metadata in system memory reduces latency in deduplication file systems. The file system may be unmounted, or synchronized (i.e., written) to disk (i.e., disk drive or other non-volatile storage), prior to another remount. Where system memory is volatile and a host system or file system crashes, data (i.e., deduplication metadata) in system memory may be lost. In the case of such a crash, a recovery process, as described herein, may be implemented to reconstruct the deduplication metadata using the core file system data (e.g., superblock, inode, indirect indexing, or the like) and data blocks. Such a recovery process may implement a near sequential read access of file system blocks on disk, which provides for an efficient recovery and reconstruction of deduplication metadata.

FIG. 1 illustrates an exemplary system for accessing deduplication metadata in a deduplication file system. Here, system 100 includes server 102, deduplication application 104, system memory 106 (e.g., RAM or other volatile or temporary memory) including metadata 116, VM manager 108

(e.g., Hypervisor), virtual machines (VMs) 110-0-110-n, storage array 112 (including storage 112-0-112-n, which includes data 118), and fault recovery module 114. The number, type, configuration, topology, connections, or other aspects of system 100 may be varied and are not limited to the examples shown and described. In some examples, deduplication application 104 may be configured to eliminate duplicate (i.e., redundant) copies of repeating data, and otherwise compress data, for storage (e.g., in storage array 112). In deduplicating a file system, deduplication application 104 may create deduplication metadata describing one or more relationships between deduplicated data and original data. Techniques associated with deduplication of virtual machine files are described in copending U.S. patent application Ser. No. 13/269,525, filed Oct. 7, 2011, entitled "Deduplication of Virtual Machine Files in a Virtualized Desktop Environment," which is incorporated herein by reference in its entirety for all purposes. Deduplication application 104 may include fault recovery module 114 configured, for example, to detect host or file system faults, such as system crashes (e.g., loss or corruption of memory, or the like), and to reconstruct deduplication metadata in system memory 106, as described herein. In some examples, system memory 106 may include RAM or other volatile or temporary memory configured to retain metadata 116 (i.e., deduplication metadata) while system memory 106 is powered. In some examples, deduplication metadata may include a blocktable, or other data structure, comprising a logical block number (LBN) as a key, and a hash value (e.g., obtained using MD5 hash, SHA-1 hash, or other hash algorithm configured to provide an identical for each duplicate file) and reference counter ("refcount") as a value. As used herein, an LBN may be configured to map a file to a block. For example, an LBN may represent or describe a block and block group, or a set of blocks and block groups, associated with a file. As used herein, a refcount may represent a number of blocks that deduplicate to an LBN. For example, a refcount may be an indication of a number of duplicate blocks in a file system. In some examples, deduplication metadata also may include another data structure (e.g., a red-black tree, or the like) comprising a hash value associated with a data block as a key, and a refcount and LBN of said data block as a value.

In some examples, VM 110-0-VM 110-n may be instances of an operating system running on various types of hardware, software, circuitry, or a combination thereof (e.g., x86 servers, or the like) that are managed by VM manager 108. In some examples, storage array 112 may comprise one or more storage media and be implemented as any type of storage facility (e.g., hard disk drive (HDD), solid state disk drive (SSD), Storage Area Network (SAN), Network Attached Storage (NAS), RAID storage, direct attached storage (DAS), or the like), such as storage solutions manufactured by EMC Corporation, headquartered in Hopkinton, Mass. In some examples, storage array 112 may be configured to store data, such as data 118, and retain data even when not powered. In some examples, data 118 may include one or more data structures (i.e., inode tables) configured to store information (e.g., location, ownership, access, and the like) about files or other objects in a file system. In some examples, VM manager 108 may be configured to create and run (i.e., operate) a VM (e.g., VMs 110-0-110-n). VM manager 108 may be implemented on a server or other computer as software, firmware, hardware, or a combination thereof. Some or all of the components of system 100 depicted in may be implemented using at least a portion of system 400 depicted in FIG. 4 and described below. In other examples, the number, type, configuration, topology, connections, or other aspects of system 100 may be implemented differently than shown or described.

In some examples, deduplication application 104 may be configured to mount a file system using fault recovery module 114 and system memory 106. As used herein, "mounting" is a state of a file system wherein the file system is formatted or otherwise prepared for access by a device, for example for input/output (I/O) operations. In some examples, mounting a file system may include providing a device with information associated with a location of one or more files in the file system. In some examples, mounting a file system may include accessing or constructing deduplication metadata associated with the file system. In some examples, fault recovery module 114 (see also fault recovery module 314 in FIG. 3) may monitor a state of a file system and construct deduplication metadata, or reconstruct deduplication metadata as described herein (see process described in FIGS. 5A-5B), in system memory 106 as part of the process of mounting the file system. In some examples, deduplication application 104 may unmount a file system by synchronizing it to disk. For example, during a file unmount, deduplication metadata constructed in system memory 106 may be written to disk (i.e., one or more of storage 112-0-112-n). In some examples, while unmounting a file system, deduplication metadata may be written to storage array 112 sequentially (i.e., in a logical sequence) at a fixed location. In some examples, said deduplication metadata for a file system may not be fully or completely synchronized (e.g., when said file system or a host system crashes during the process of unmounting), then the unmount of said file system is unclean (i.e., incomplete or otherwise interrupted), and a subsequent remount of said file system may include a reconstruction process, as described below (see FIGS. 3A-3B). In some examples, in a steady state of a file system, deduplication metadata for said file system may be maintained exclusively in system memory 106 until said file system is unmounted. In some examples, deduplication metadata maintained in system memory 106 may comprise a data structure comprising a hash table and a red black tree, as described herein. For example, a hash table, or similar data structure, may be used for lookup based on LBN as a key; and a red black tree, or similar data structure, may be used for lookup based on a hash value of a data block as a key. In this example, values in said data structures may comprise a triplet of {a hash value, a logical block number and a refcount}. In some examples, hash operations, including insertions, deletions, updates, and the like, may be conducted using system memory 106, with a synchronization of data to disk once such operations are concluded (i.e., when unmounting a file system), as described herein. In other examples, other types of data structures may be used to hold deduplication metadata in system memory 106. In other examples, the number, type, configuration, topology, connections, or other aspects of system 100 may be different, and are not limited to the examples shown and described herein.

Figure 2A:
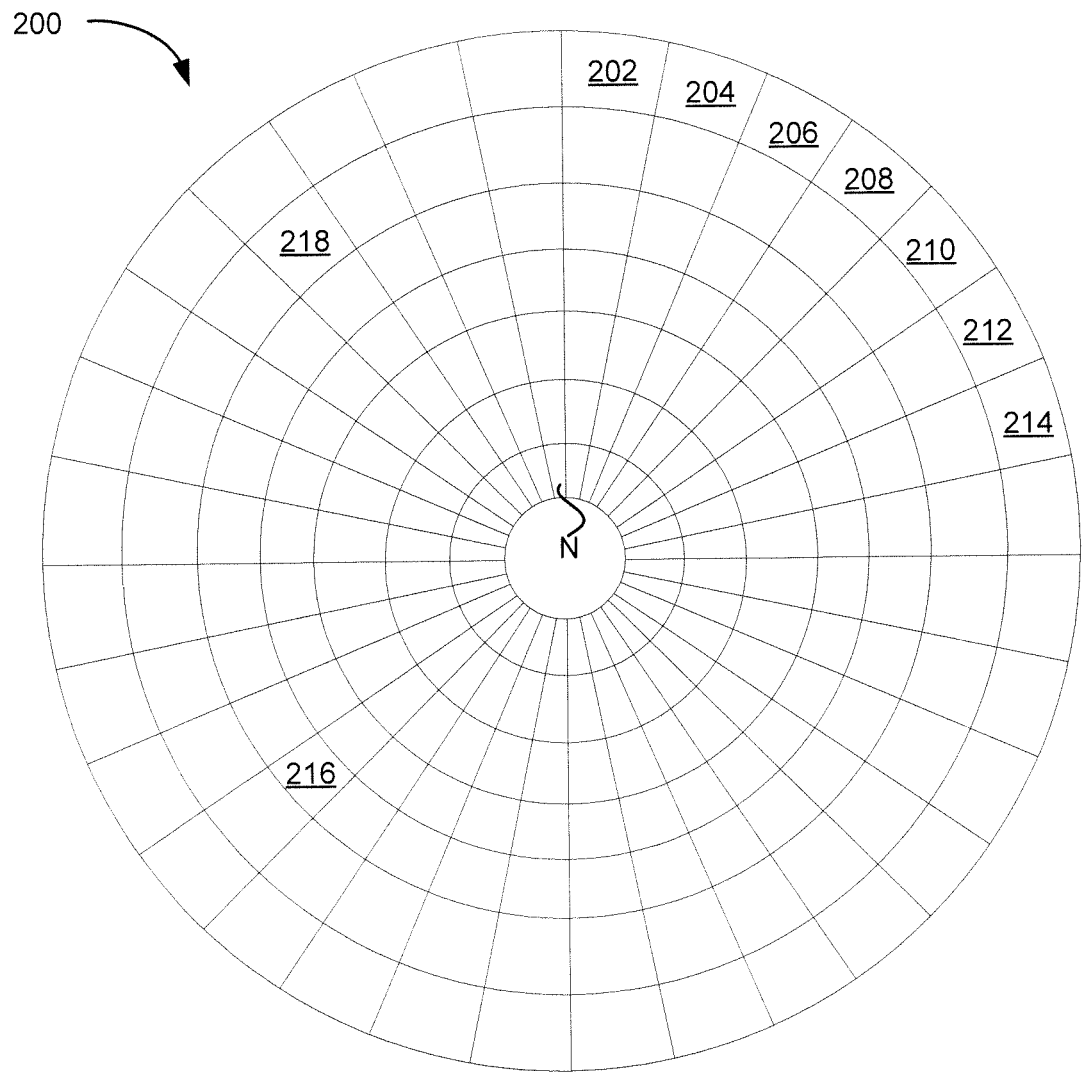
FIG. 2A depicts an exemplary storage device comprising blocks.
Figure 2B:
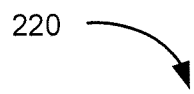
FIG. 2B illustrates an exemplary table of blocks and block groups.

FIG. 2A depicts an exemplary storage device comprising data blocks. Here, disk 200 of a disk drive, or other storage device, may include blocks 202-218 through block N. An example of how blocks 202-218 and block N may be allocated into block groups is shown in FIG. 2B. FIG. 2B illustrates an exemplary table of blocks and block groups in a storage device. In some examples, a block group may consist of a logical sequence of blocks to which data (e.g., deduplication metadata, as described herein) may be written. In some examples, sequential blocks in a block group may be physically located near each other in a storage drive (e.g., block group A). In other examples, sequential blocks in a block group may not be physically located near each other in a storage drive, but may still be logically in sequence (e.g., block group B). For example, table 220 shows that block group A includes blocks 202, 204, 206, 208 and 210, which may be physically located in sequence, as well as logically in sequence. Table 220 further shows that block group B includes blocks 212, 214, 216 and 218, which may be logically in sequence, but not necessarily physically located in sequence. In some examples, remaining blocks in disk drive 200, including block N, may be grouped into various other block groups. In still other examples, a storage device (e.g., storage 112-0-112-n in FIG. 1, storage 312 in FIG. 3, or the like) may be implemented differently, and is not limited to the examples described or shown herein.

Figure 3:
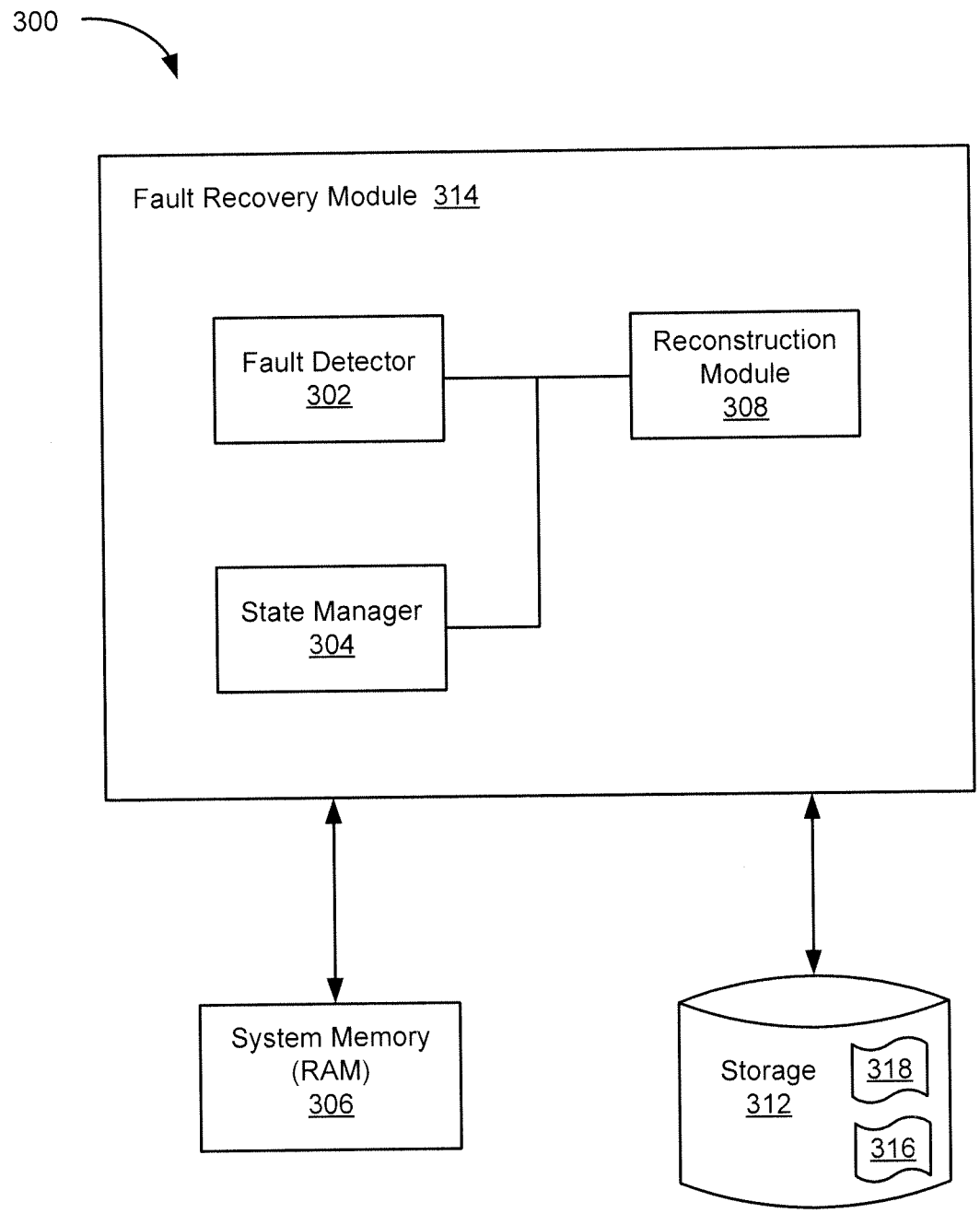
FIG. 3 illustrates an exemplary system for constructing deduplication metadata in a deduplication file system.

FIG. 3 illustrates an exemplary system for constructing deduplication metadata in a deduplication file system. Here, system 300 includes system memory 306, storage 312, and fault recovery module 314, which may include fault detector 302, state manager 304 and reconstruction module 308. Like-numbered and named elements may describe the same or substantially similar elements as those shown in other descriptions. In some examples, system memory 306 may include RAM or other volatile, temporary memory that may be quickly and efficiently accessed. In some examples, storage 312 may be configured to store core file system data 318, which may include inode tables or other data structures for maintaining core file system metadata (e.g., superblock, inode, indirect indexing, or the like). In some examples, storage 312 also may be configured to store flag data 316 associated with a file system. As described herein, flag data 316 may indicate a state of a file system (e.g., mounted, unmounted, steady state, crashed, or the like). In some examples, flag data 316 may be set to a value (i.e., 1) once a file system associated with flag data 316 has been mounted successfully and is in steady state. In some examples, flag data 316 may be set to another value (i.e., 0) after a file system associated with flag data 316 has been unmounted (i.e., synchronized to disk) successfully.

Fault recovery module 314 may be implemented as hardware, software, firmware, circuitry, or a combination thereof. In some examples, fault recovery module 314 may be implemented as software, and may include fault detector 302, state manager 304 and reconstruction module 308. In some examples, fault detector 302 may be configured to detect whether there has been a loss of power to a server (e.g., server 102 in FIG. 1, or the like) on which fault recovery module 314 resides, or other type of host system or file system crash. In some examples, state manager 304 may be configured to monitor a state of a deduplication file system. For example, state manager 304 may be configured to read flag data 316 to determine whether a deduplication file system is in a mounted state, unmounted state, or steady state, for example, after a power outage or crash. In some examples, state manager 304 also may be configured to set flag data 316 to a value to indicate a state of a deduplication file system. For example, state manager 304 may set flag data 316 to a value (i.e., 1) after a deduplication file system is mounted cleanly (i.e., completely or without interruption by a crash or power outage). In another example, state manager 304 may set flag data 316 to another value (i.e., 0) after deduplication file system is unmounted cleanly. In some examples, reconstruction module 308 may be configured to construct or reconstruct deduplication metadata (e.g., in a reconstruction map, red black tree, or other data structure) in system memory 306, as described herein (see FIGS. 5A-5B). For example, when fault detector 302 detects a crash or power loss, state manager 304 may read flag data 316 to determine a state of a deduplication file system. If flag data 316 indicates that a deduplication file system was unmounted uncleanly (i.e., incompletely or was interrupted by the crash), then reconstruction module 308 may reconstruct deduplication metadata associated with said deduplication file system (e.g., using process described in FIGS. 5A-5B) in system memory 306. In other examples, system 300 may be implemented differently, and is not limited to the examples shown and described herein.

Figure 4:
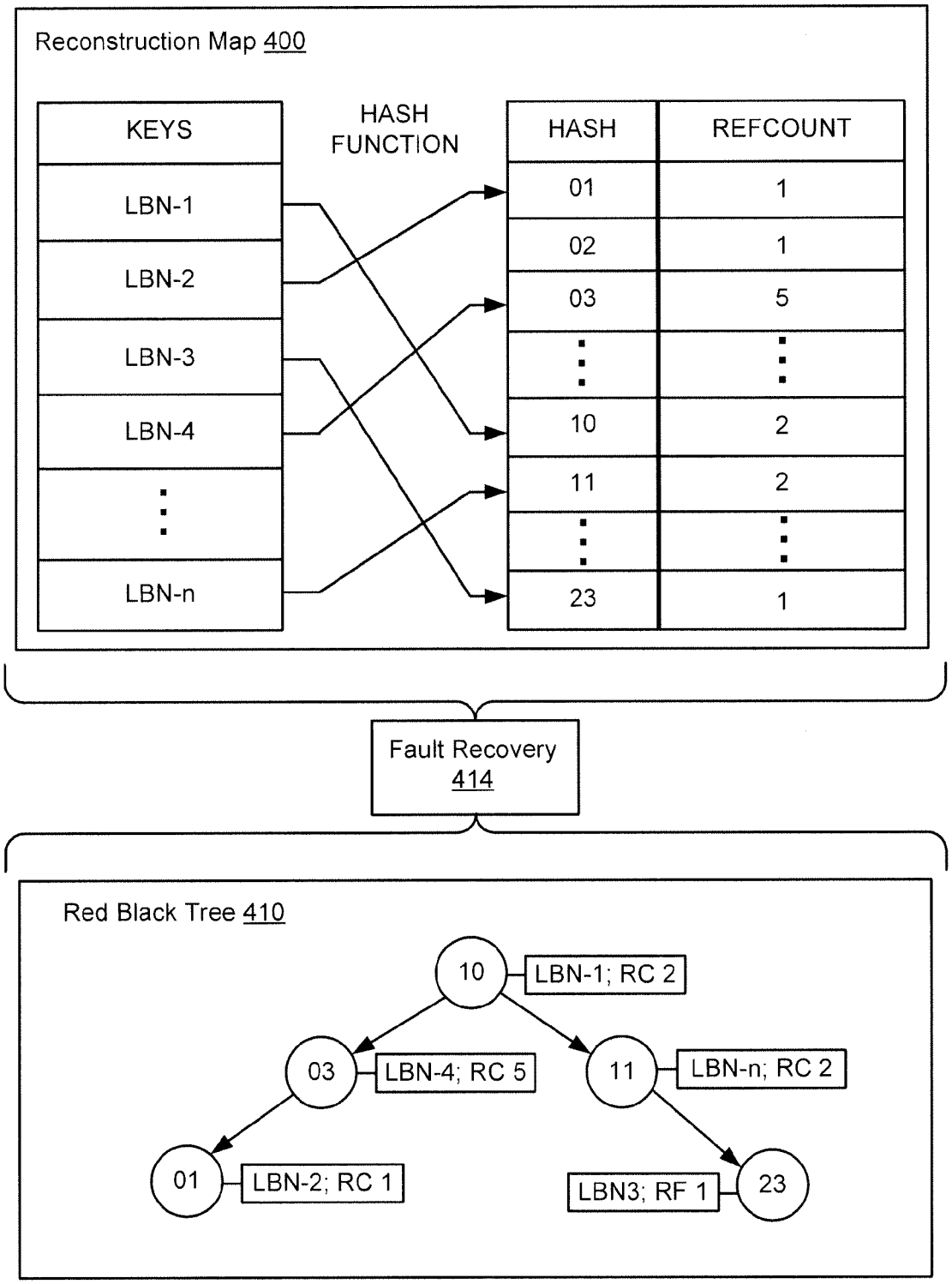
FIG. 4 illustrates exemplary data structures created by a fault recovery system.

FIG. 4 illustrates exemplary data structures created by a fault recovery system. Here, fault recovery module 414 may create reconstruction map (i.e., blocktable or hash table) 400 and red black tree 410 using a deduplication metadata reconstruction process as described herein (e.g., FIGS. 5A-5B). Like-numbered and named elements may describe the same or substantially similar elements as those shown in other descriptions. In some examples, reconstruction map 400 may include LBN-1-LBN-n as keys, and hash values and refcounts as values. As described herein, each LBN (e.g., LBN-1-LBN-n) may reference or comprise a set of block groups and blocks, each set comprising at least one block group and block. In an example, in reconstruction map 400, LBN-1 (i.e., representing a set of blocks and block groups) may be associated with hash value 10 and refcount 2 (i.e., indicating that two blocks deduplicate to LBN-1). In another example, LBN-2 may be associated with hash value 01 and refcount 1. In an alternative example, LBN-3 may be associated with hash value 23 and refcount 1. In still another example, LBN-4 may be associated with hash value 03 and refcount 5, and so on through LBN-n, which may be associated with hash value 11 and refcount 2. This same deduplication metadata may also be maintained (i.e., created and stored in RAM (e.g., in system memory 106 in FIG. 1, system memory 306 in FIG. 3, memory 606 in FIG. 6, or the like)) in red black tree 410. In some examples, red black tree 410 may maintain hash values as keys, associating each of the keys with a respective LBN and a refcount, as shown. In an example, red black tree 410 may be organized by hash values as keys, with LBN-1 and its refcount of 2 associated with hash value 10, LBN-2 and its refcount of 1 associated with hash value 01, and so on. In other examples, deduplication metadata may be created and maintained in RAM using different data structures, not limited to the examples shown and described herein.

Figure 5A:
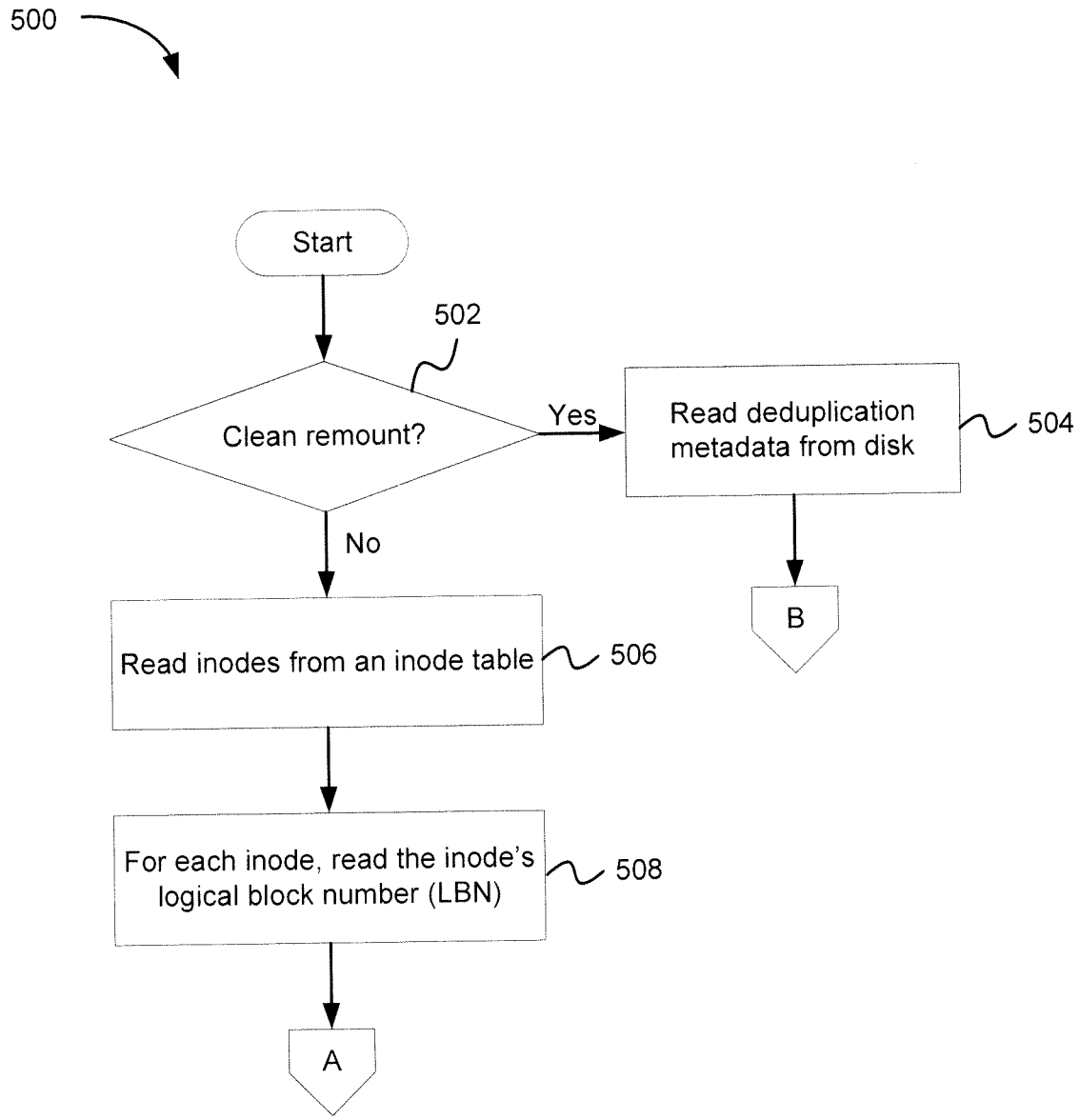
FIGS. 5A-5B illustrate an exemplary flow for constructing deduplication metadata in a deduplication file system.
Figure 5B:
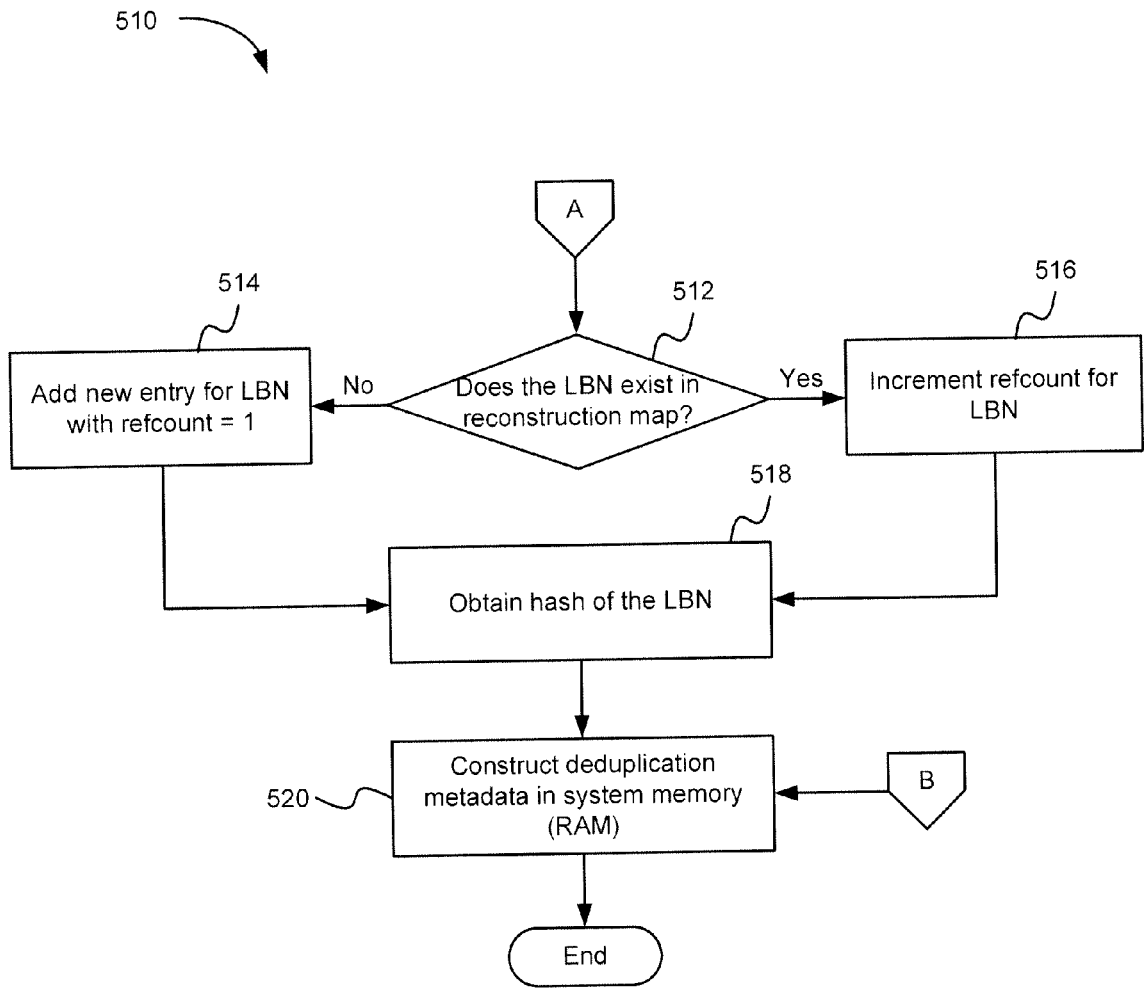

FIGS. 5A-5B illustrate an exemplary flow for constructing deduplication metadata in a deduplication file system. Here, flow 500 begins with determining whether a clean remount is being conducted (502). A clean remount of a file system may take place after a file system instance has been mounted and unmounted properly. In some examples, a file system instance is unmounted properly when deduplication metadata constructed in a system memory (e.g., system memory 106 in FIG. 1, other RAM, or the like) is written to disk sequentially at a fixed location on disk, successfully and completely, for a subsequent mount to read from. In some examples, a clean or unclean remount of a file system may be determined using a flag or other tag or marker (hereinafter "flag") maintained on disk in association with the file system data. For example, on a freshly formatted and mounted file system instance, where there is no deduplication metadata generated yet, a file system may generate a flag on disk with the file system data to track whether the file system is unmounted cleanly. In this example, such a flag may be set at "0" to begin, and then set to "1" once said file system is mounted and available for I/O operations, as described herein. Once said file system is cleanly unmounted (i.e., synchronized to disk), the flag may be set back to "0."

In the case of a clean remount (i.e., flag is set at "0" from a previous complete unmountin of a file system), deduplication metadata may be read from disk (504), as the deduplication metadata on disk is current. In some examples, reading the deduplication metadata may include reading a blocktable stored on disk. In this example, deduplication metadata may be constructed in a system memory (e.g., system memory 106 in FIG. 1, other RAM, or the like) (520), as shown in flow 510 in FIG. 5B, based on a read of said blocktable from disk to mount a file system.

In the case of an unclean remount (i.e., flag is set at "1" from previous mounting of a file system, and synchronization of file system to disk was not complete), deduplication metadata stored on disk may be outdated, and thus may be discarded. Updated deduplication metadata may be reconstructed using core file system data (e.g., superblock, inode, indirect indexing, or the like). Such a reconstruction may include reading inodes from an inode table (506), or other data structure, configured to store information about files in a file system, including location information. In some examples, an inode table may include a description of a file's location (i.e., physical location), including which blocks and block groups in which said file may be stored, and thus a file may be found (i.e., looked up), using an inode entry in an inode table. For example, a first inode entry may indicate that a first file is saved in a first sequence of blocks in a block group (e.g., blocks 214-218 in block group B in FIGS. 2A-2B). In another example, a second inode entry may indicate that a second file is saved in a second sequence of blocks in a block group (e.g., blocks 202-208 in block group A in FIGS. 2A-2B). In still other examples, a third file may be saved in a third sequence of blocks that may overlap, or be wholly or partially the same as, the first or second sequence of blocks (e.g., blocks 208-214 in FIGS. 2A-2B). For each inode, the inode's LBN may be read (508) to determine a location (i.e., block and block group) of a file. In some examples, the flow may continue to flow 510 in FIG. 5B, where for each LBN, it may be determined whether said LBN exists in a reconstruction map (512). In some examples, a reconstruction map may comprise a hash table, or other data structure configured to map LBNs with refcounts. A reconstruction map may be modified based on a determination of whether an LBN exists in said reconstruction map. For example, if it is determined that an LBN does not yet exist in a reconstruction map, a new entry may be added to the reconstruction map for said LBN (a key) and associated with a refcount of "1" (a value) (514). In another example, if it is determined that an LBN does exist in a reconstruction map, the refcount (value) associated with said LBN (key) may be incremented (i.e., by adding +1 to the refcount value) (516). By reading an inode table from beginning to end, the above-described process yields a map of LBNs and associated refcounts in a reconstruction map. A hash value may then be obtained (i.e., calculated) for each of the LBNs using a hash function (e.g., MD5 hash, SHA-1 hash, or the like) (518). In some examples, by obtaining a hash value for each of the LBNs, a determination may be made as to which files are duplicates. For example, a hash function may be applied to a data block to generate a hash signature or value, and thus data blocks having the same hash signature or value as a result of the same hash function are duplicates.

In some examples, the LBNs for a file system may be read sequentially from disk to retrieve one or more associated data blocks, and deduplication metadata for the file system may be constructed in a system memory (e.g., system memory 106 in FIG. 1, other RAM, or the like) (520). In some examples, the hash value for an LBN also may be entered as a value in a reconstruction map against (i.e., in association with) said LBN, The above-described recovery process implements a near sequential read access of file system blocks on disk to reconstruct deduplication metadata to increase efficiency for faster reconstruction of a deduplication file system with updated metadata loaded into a system memory. In other examples, the above-described process may be varied in steps, order, function, processes, or other aspects, and is not limited to those shown and described.

Figure 6:
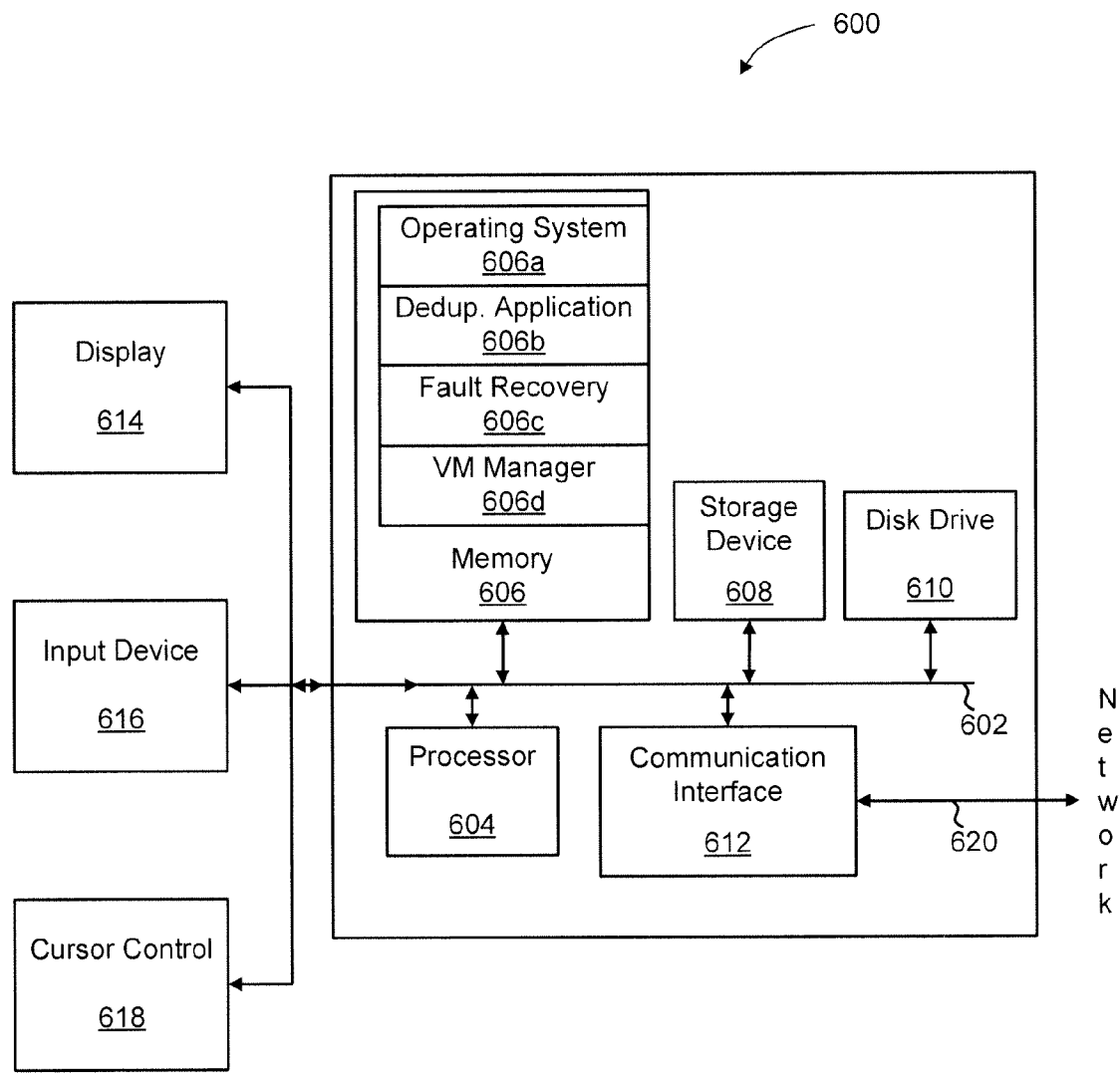
FIG. 6 illustrates an exemplary computer system suitable for deduplication metadata access in deduplication file system.

FIG. 6 illustrates an exemplary computer system suitable for deduplication metadata access in deduplication file system. In some examples, computer system 600 may be used to implement computer programs, applications, methods, processes, or other software to perform the above-described techniques. Computer system 600 includes a bus 602 or other communication mechanism for communicating information, which interconnects subsystems and devices, such as processor 604, system memory 606 (e.g., RAM), storage device 608 (e.g., ROM), disk drive 610 (e.g., magnetic or optical), communication interface 612 (e.g., modem or Ethernet card), display 614 (e.g., CRT or LCD), input device 616 (e.g., keyboard), and cursor control 618 (e.g., mouse or trackball). System memory 606 may include various modules, such as operating system 606*a*, deduplication application 606*b*, fault recovery module 606*c*, and VM manager 606*d*. Modules 606*a*-606*d* may be implemented as software, as shown disposed in memory 606, or as hardware, firmware, circuitry, or a combination thereof. Like-numbered and named elements may describe the same or substantially similar elements as those shown in other descriptions.

According to some examples, computer system 600 performs specific operations by processor 604 executing one or more sequences of one or more instructions stored in system memory 606. Such instructions may be read into system memory 606 from another computer readable medium, such as static storage device 608 or disk drive 610. In some examples, hard-wired circuitry may be used in place of or in combination with software instructions for implementation.

The term "computer readable medium" refers to any tangible medium that participates in providing instructions to processor 604 for execution. Such a medium may take many forms, including but not limited to, non-volatile media and volatile media. Non-volatile media includes, for example, optical or magnetic disks, such as disk drive 610. Volatile media includes dynamic memory, such as system memory 606.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

Instructions may further be transmitted or received using a transmission medium. The term "transmission medium" may include any tangible or intangible medium that is capable of storing, encoding or carrying instructions for execution by the machine, and includes digital or analog communications signals or other intangible medium to facilitate communication of such instructions. Transmission media includes coaxial cables, copper wire, and fiber optics, including wires that comprise bus 402 for transmitting a computer data signal.

In some examples, execution of the sequences of instructions may be performed by a single computer system 600. According to some examples, two or more computer systems 600 coupled by communication link 620 (e.g., LAN, PSTN, or wireless network) may perform the sequence of instructions in coordination with one another. Computer system 600 may transmit and receive messages, data, and instructions, including program, i.e., application code, through communication link 620 and communication interface 612. Received program code may be executed by processor 604 as it is received, and/or stored in disk drive 610, or other non-volatile storage for later execution.

The foregoing description, for purposes of explanation, uses specific nomenclature to provide a thorough understanding of the invention. However, it will be apparent to one skilled in the art that specific details are not required in order to practice the invention. In fact, this description should not be read to limit any feature or aspect of the present invention to any embodiment; rather features and aspects of one embodiment can readily be interchanged with other embodiments. Notably, not every benefit described herein need be realized by each embodiment of the present invention; rather any specific embodiment can provide one or more of the advantages discussed above. In the claims, elements and/or operations do not imply any particular order of operation, unless explicitly stated in the claims. It is intended that the following claims and their equivalents define the scope of the invention. Although the foregoing examples have been described in some detail for purposes of clarity of understanding, the above-described inventive techniques are not limited to the details provided. There are many alternative ways of implementing the above-described invention techniques. The disclosed examples are illustrative and not restrictive.

What is claimed is:

1. A method, comprising:
   determining a state of a file system comprising reading a flag configured to track whether a previous unmount of the file system was complete;
   reading a table associated with the file system, including reading a plurality of block numbers associated with a plurality of files in the file system, the table being stored on a disk in a non-volatile storage, wherein the plurality of block numbers includes a block number and another block number, wherein each block number is read to determine an ordered sequence of locations on the disk of one or more data blocks or block groups for a file associated with said each block number;
   determining whether each of the plurality of block numbers exists in a reconstruction map being created in a volatile system memory;
   modifying the reconstruction map by adding a new entry to the reconstruction map for a block number that does not already exist in the reconstruction map, and incrementing a reference count in the reconstruction map for a block number that does already exist in the reconstruction map;
   obtaining a hash value associated with each of the plurality of block numbers and adding the hash value to corresponding entries of the reconstruction map;
   reading a plurality of block numbers sequentially from the disk to retrieve corresponding data blocks or block groups from the ordered sequence of locations on the disk using the plurality of block numbers; and
   constructing a deduplication metadata data structure that describes file system data based on the hash value, wherein the deduplication metadata structure is constructed in the volatile system memory from the reconstruction map.

2. The method of claim 1, wherein determining the state of the file system comprises determining that a previous unmount of the file system was unclean.

3. The method of claim 1, wherein the table comprises an inode table.

4. The method of claim 1, wherein the block number comprises a logical block number, and the another block number comprises another logical block number.

5. The method of claim 1, wherein adding the new entry for the block number that does not already exist in the reconstruction map comprises associating the block number with a reference count value of 1.

6. The method of claim 1, further comprising setting the flag to a first value after constructing the deduplication metadata in the volatile system memory.

7. The method of claim 6, further comprising unmounting the file system.

8. The method of claim 7, wherein unmounting the file system comprises writing the deduplication metadata to a storage array.

9. The method of claim 7, further comprising setting the flag to a second value after unmounting the file system.

10. A system, comprising:
    a volatile system memory configured to store a deduplication metadata; and
    a processor configured to run a deduplication application configured to
       determine a state of a file system and read a table associated with the file system, including reading a plurality of block numbers associated with a plurality of files in the file system, wherein the plurality of block numbers includes a block number and another block number, and wherein each block number is read to determine an ordered sequence of locations on a disk of one or more data blocks or block groups for a file associated with said each block number, and wherein the state of the file system is determined by reading a flag configured to track whether a previous unmount of the file system was complete
       determine whether each of the plurality of block numbers exists in a reconstruction map being created in the volatile system memory,
       modify the reconstruction map by adding a new entry to the reconstruction map for a block number that does not already exist in the reconstruction map, and incrementing a reference count in the reconstruction map for a block number that does already exist in the reconstruction map,
       obtain a hash value associated with each of the plurality of block numbers and add the hash value to corresponding entries of the reconstruction map,
       read a plurality of block numbers sequentially from the disk to retrieve corresponding data blocks or block groups from the ordered sequence of locations on the disk using the plurality of block numbers, and
       construct the deduplication metadata as a deduplication metadata data structure that describes file system data based on the hash value, wherein the deduplication metadata structure is constructed in the volatile system memory from the reconstruction map.

11. The system of claim 10, further comprising a storage configured to store the table and the deduplication metadata.

12. The system of claim 10, wherein the plurality of block numbers references a block group in a storage.

13. The system of claim 10, wherein the plurality of block numbers references a block in a storage.

14. The system of claim 10, wherein the reconstruction map comprises a plurality of hash values, each of the plurality of hash values associated with at least one of the plurality of block numbers.

15. The system of claim 10, wherein the reconstruction map comprises a hash table in which a key comprises one of the plurality of block numbers.

16. The system of claim 10, further comprising a virtual machine manager configured to create and operate a virtual machine.

17. A computer program product embodied in a non-transitory computer readable medium and comprising computer instructions for:

determining a state of a file system comprising reading a flag configured to track whether a previous unmount of the file system was complete;

reading a table associated with the file system, including reading a plurality of block numbers associated with a plurality of files in the file system, the table being stored on a disk in a non-volatile storage, wherein the plurality of block numbers includes a block number and another block number, wherein each block number is read to determine an ordered sequence of locations on the disk of one or more data blocks or block groups for a file associated with said each block number;

determining whether each of the plurality of block numbers exists in a reconstruction map being created in a volatile system memory;

modifying the reconstruction map by adding a new entry to the reconstruction map for a block number that does not already exist in the reconstruction map, and incrementing a reference count in the reconstruction map for a block number that does already exist in the reconstruction map;

obtaining a hash value associated with each of the plurality of block numbers and adding the hash value to corresponding entries of the reconstruction map;

reading a plurality of block numbers sequentially from the disk to retrieve corresponding data blocks or block groups from the ordered sequence of locations on the disk using the plurality of block numbers; and constructing a deduplication metadata data structure that describes file system data based on the hash value, wherein the deduplication metadata structure is constructed in the volatile system memory from the reconstruction map.

\* \* \* \* \*